(12) United States Patent
Usami

(10) Patent No.: US 8,615,925 B2
(45) Date of Patent: Dec. 31, 2013

(54) LIGHT GUIDING FILM AND PLANT GROWING METHOD USING THE LIGHT GUIDING FILM

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

(21) Appl. No.: 13/011,947

(22) Filed: Jan. 24, 2011

(65) Prior Publication Data

US 2011/0197503 A1   Aug. 18, 2011

(30) Foreign Application Priority Data

Feb. 16, 2010   (JP) ................................. 2010-031746

(51) Int. Cl.
*A01G 7/00* (2006.01)
*G02B 6/10* (2006.01)

(52) U.S. Cl.
USPC ..................................... 47/58.1 LS; 385/129

(58) Field of Classification Search
USPC ........... 47/1.01 R, 1.4, 17, 29.1, 32.3, 58.1 R, 47/58.1 S, DIG. 9; 428/411.1; 430/269, 430/321, 644; 362/84, 551; 359/326, 332; 385/129–132
See application file for complete search history.

(56) References Cited

U.S. PATENT DOCUMENTS

| | | | | |
|---|---|---|---|---|
| 3,372,513 A | * | 3/1968 | Shlesinger, Jr. et al. | ... 47/58.1 R |
| 3,542,710 A | * | 11/1970 | Glatti Flaviano | ............. 524/114 |
| 4,128,307 A | * | 12/1978 | Badertscher et al. | ......... 359/596 |
| 4,235,043 A | * | 11/1980 | Harasawa et al. | ................. 47/1.4 |
| 4,329,535 A | * | 5/1982 | Rapp | .............................. 136/259 |
| 4,368,725 A | * | 1/1983 | McClintock | .................. 126/595 |
| 4,761,913 A | * | 8/1988 | Henningsson et al. | ............ 47/17 |
| 5,022,181 A | * | 6/1991 | Longstaff | ........................... 47/31 |
| 5,078,462 A | * | 1/1992 | Gravisse | ....................... 359/359 |
| 5,786,102 A | * | 7/1998 | Paz-Pujalt et al. | ............ 428/689 |
| 5,953,857 A | * | 9/1999 | Aiga et al. | ...................... 47/29.4 |
| 5,956,175 A | * | 9/1999 | Hojnowski | .................... 359/360 |
| 6,538,191 B1 | * | 3/2003 | MacDonald | .................. 136/247 |
| 2003/0009933 A1 | * | 1/2003 | Yoneda et al. | ............. 47/1.01 R |
| 2007/0184274 A1 | * | 8/2007 | Wheatley et al. | .......... 428/411.1 |
| 2007/0210326 A1 | | 9/2007 | Kurihara | |
| 2009/0040745 A1 | * | 2/2009 | Nemchuk | ........................ 362/84 |
| 2009/0155864 A1 | * | 6/2009 | Bauer et al. | ................... 435/134 |

(Continued)

FOREIGN PATENT DOCUMENTS

| | | |
|---|---|---|
| JP | 4-299975 A | 10/1992 |
| JP | 6-38635 A | 2/1994 |

(Continued)

OTHER PUBLICATIONS

Japanese Office Action for Japanese Application No. 2010-031746 dated Mar. 12, 2013 with partial English translation.

(Continued)

*Primary Examiner* — Rob Swiatek
*Assistant Examiner* — Ebony Evans
(74) *Attorney, Agent, or Firm* — Birch Stewart Kolasch & Birch, LLP

(57) ABSTRACT

A light guiding film including: a light entrance portion which allows incident light from a light source to enter; a wavelength converting portion which absorbs the incident light and converts the wavelength of the incident light to a wavelength utilizable for growth of a plant; and a light exit portion which allows the light with the converted wavelength to exit.

15 Claims, 6 Drawing Sheets

(56) References Cited

U.S. PATENT DOCUMENTS

| | | | |
|---|---|---|---|
| 2010/0021739 A1* | 1/2010 | Aruga et al. | 428/411.1 |
| 2010/0080996 A1* | 4/2010 | Ono | 428/413 |
| 2011/0025951 A1* | 2/2011 | Jones | 349/70 |
| 2011/0112769 A1* | 5/2011 | Niederberger et al. | 702/1 |

FOREIGN PATENT DOCUMENTS

| | | |
|---|---|---|
| JP | 10-62786 A | 3/1998 |
| JP | 2601449 Y2 | 11/1999 |
| JP | 2003-215348 A | 7/2003 |
| JP | 2003-304747 A | 10/2003 |
| JP | 2007-258038 A | 10/2007 |
| JP | 2008-112711 A | 5/2008 |
| JP | 2008-181771 A | 8/2008 |
| JP | 2010-4869 A | 1/2010 |
| JP | 2010-034502 A | 2/2010 |
| WO | WO 2010085853 A1 * | 8/2010 |

OTHER PUBLICATIONS

Kayo Corporation, Ltd., "List of Properties of Plastics (Thermoplastic)," http://www.kayo-corp.co.jp/common/pdf/pla_propertylist01.pdf, 2 pages total, date unknown.

Japanese Office Action for Japanese Application No. 2010-031746 dated Jul. 2, 2013 with partial English translation.

* cited by examiner

LIGHT GUIDING FILM AND PLANT GROWING METHOD USING THE LIGHT GUIDING FILM

BACKGROUND OF THE INVENTION

1. Field of the Invention

The present invention relates to a light guiding film suitable for growing a plant by photosynthesis, and a plant growing method using the light guiding film.

2. Description of the Related Art

Nowadays, there is heightening consciousness of the environment, since if the amount of carbon dioxide, emitted by the use of fossil fuels such as petroleum, increases in the air, the global environment will degrade causing global warming, etc., there will frequently be drought, heavy rain, flooding and the like as well as destruction of the natural environment, natural disasters will arise, agricultural products will be greatly damaged and there will be grave adverse effects on the human society.

Accordingly, as methods for reducing carbon dioxide emitted to the air, methods of applying sunlight to plants such as algae and utilizing the photosynthesis of the plants to reduce carbon dioxide in the air are being examined, and apparatuses to promote photosynthesis of plants are being examined as well.

Regarding the methods for reducing carbon dioxide and the apparatuses to promote photosynthesis of plants, application of light from a light source into a light guiding film through a light entrance portion of the light guiding film is being examined. This light applied into the light guiding film is repeatedly reflected between a light exit surface (upper surface) and a reflective surface (lower surface) of the light guiding film, and when the angle formed between the reflected light and the normal line to the light exit surface is smaller than the critical angle, the reflected light permeates and exits through the light exit surface.

Regarding such a light guiding film, in general, since an opposed light entrance portion positioned on the opposite side to a light entrance portion has flatness, parallel light emitted in the direction perpendicular to a light entrance surface or light whose angle of incidence to an opposed light entrance surface is smaller than the critical angle, among lights emitted from a light source, directly exits to the outside from the opposed light entrance surface side, and thus there is a loss of light caused.

Thus, the methods for reducing carbon dioxide and the apparatuses to promote photosynthesis of plants present a problem in which light necessary for the photosynthesis does not sufficiently reach the plants, although the plants may be photosynthesized to some extent.

To solve such a problem, there has, for example, been proposed a method in which light is made to enter from an end of an apparatus, such that the light is guided at a surface portion in an enclosed manner and exits to an intended area (refer to Japanese Utility Model Registration No. 2601449).

However, light which does not enter perpendicularly to the end of the apparatus leaks before a light exit portion instead of being guided to the light exit portion and thus there is a decrease in light extraction efficiency, which is problematic.

Also, there has been proposed a method in which light is guided at a surface portion in an enclosed manner and made to exit to an intended area (refer to Japanese Patent Application Laid-Open (JP-A) No. 2003-215348).

Meanwhile, there has, for example, been proposed a method in relation to a member (e.g., a photosynthesizing member) that converts light into effective matter, wherein the light is made to have such a wavelength as enables highly efficient conversion of the light into the effective matter (refer to JP-A No. 06-38635).

However, there exists the following problem: interfacial reflection arises at a refractive index interface that leads to the converted matter, and thus the light extraction efficiency with which the light is guided to an intended place is low.

BRIEF SUMMARY OF THE INVENTION

The present invention is aimed at solving the problems in related art and achieving the following object. An object of the present invention is to provide a light guiding film with which a plant can be efficiently grown, and a plant growing method using the light guiding film.

Means for solving the problems are as follows.

<1> A light guiding film including:

a light entrance portion which allows incident light from a light source to enter;

a wavelength converting portion which absorbs the incident light and converts the wavelength of the incident light to a wavelength utilizable for growth of a plant; and a light exit portion which allows the light with the converted wavelength to exit.

<2> The light guiding film according to <1>, wherein the relationship $\lambda_1 < \lambda_2$ is satisfied, where $\lambda_1$ (nm) denotes a peak wavelength of the light absorbed by the wavelength converting portion, and $\lambda_2$ (nm) denotes a peak wavelength of the light with the converted wavelength.

<3> The light guiding film according to <2>, wherein $\lambda_1$ is in the range of 300 nm to 700 nm, and $\lambda_2$ is in the range of 400 nm to 1,000 nm.

<4> The light guiding film according to any one of <1> to <3>, wherein the wavelength converting portion includes a fluorescent material.

<5> The light guiding film according to <4>, wherein the fluorescent material contains a perylene compound.

<6> The light guiding film according to any one of <1> to <5>, wherein the light entrance portion includes a light entrance surface, and the wavelength converting portion is provided on a surface of the light entrance portion on the opposite side to the light entrance surface.

<7> The light guiding film according to any one of <1> to <6>, further including a light guiding portion which guides the light with the converted wavelength, situated between the light entrance portion and the light exit portion.

<8> The light guiding film according to <7>, further including a reflective layer formed on a surface of the light entrance portion with respect to a film thickness direction or on surfaces of the light entrance portion and the light guiding portion with respect to the film thickness direction.

<9> The light guiding film according to any one of <1> to <8>, wherein the light entrance portion has a refractive index of 1.05 to 1.8.

<10> The light guiding film according to any one of <1> to <9>, wherein the wavelength converting portion has a refractive index of 1.5 or greater.

<11> The light guiding film according to any one of <1> to <10>, wherein the difference in refractive index between the wavelength converting portion and the light entrance portion is in the range of 0.01 to 2.0.

<12> The light guiding film according to any one of <1> to <11>, wherein the light exit portion has minute concave and convex portions at least part of a surface thereof.

<13> A plant growing method including:

growing a plant using a light guiding film, wherein the light guiding film is the light guiding film according to any one of <1> to <12>, and wherein the wavelength of the light which has entered from the light entrance portion of the light guiding film is converted to a wavelength utilizable for growth of the plant, and the light exit portion of the light guiding film is placed so as to allow the light to exit from the light exit portion to a place for the growth of the plant.

<14> The plant growing method according to <13>, wherein the plant is algae including microalgae.

The present invention solves the problems in related art and achieves the above object of providing a light guiding film with which a plant can be efficiently grown, and a plant growing method using the light guiding film.

Figure 1:
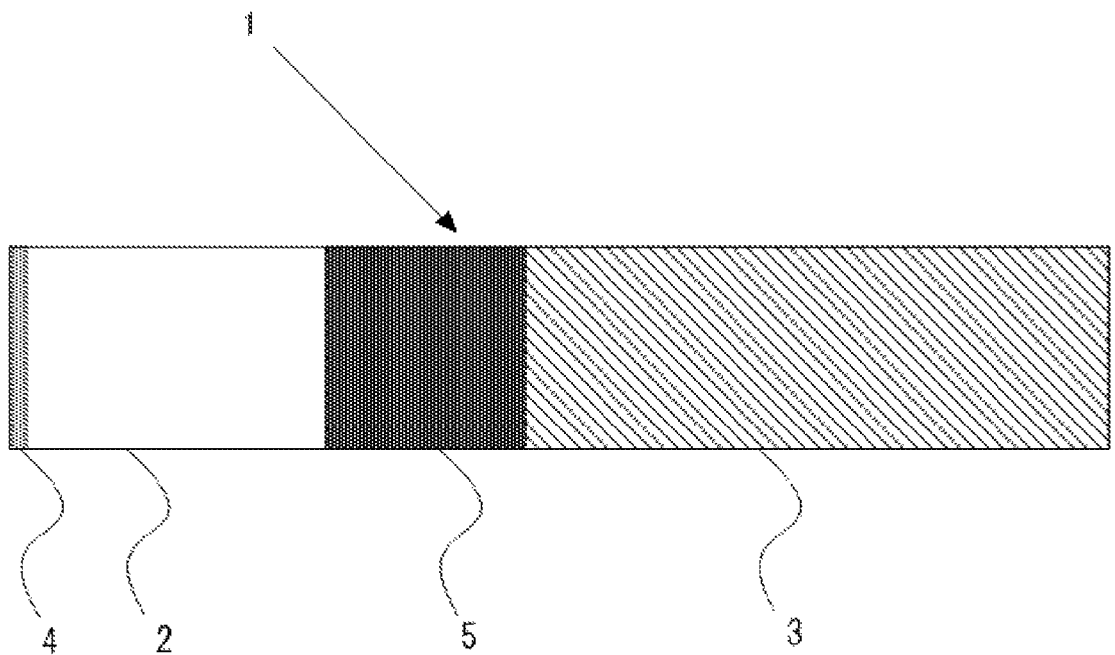
FIG. 1 is a plan view of a light guiding film according to a first embodiment.

DETAILED DESCRIPTION OF THE INVENTION (Light Guiding Film)

A light guiding film of the present invention includes a light entrance portion, a wavelength converting portion and a light exit portion and may, if necessary, include a light guiding portion.

The shape of the light guiding film is not particularly limited and may be suitably changed according to the purpose of the use; for example, the light guiding film may be rectangular, square, circular, etc. and is preferably rectangular because it can be easily processed at a low cost.

The light guiding film is not particularly limited. The light entrance portion, the light guiding portion and the light exit portion may be formed of separate members but are preferably formed of a series of members because the light guiding film can be produced at a lower cost. In the present specification, the series of members is referred to also as "film main body". The film main body is preferably bendable.

The material forming the film main body of the light guiding film is not particularly limited as long as it is transparent and has a certain degree of strength; for example, the material is a resin, glass, etc. Among these, a resin is preferable because of its pliability and lightness.

The resin is not particularly limited and may be suitably selected according to the intended purpose. Examples of the resin include transparent materials such as polystyrene, styrene-methyl methacrylate copolymers, (meth)acrylic resins, polymethyl pentene, allyl glycol carbonate resins, spirane resins, amorphous polyolefins, polycarbonates, polyamides, polyarylates, polysulfones, polyarylsulfones, polyethersulfones, polyetherimides, polyimides, diallyl phthalate, fluorine resins, polyester carbonates, norbornene resins (e.g., ARTON), alicyclic acrylic resins (e.g., OPTOREZ), silicone resins, acrylic rubbers and silicone rubbers. These may be used individually or in combination.

Among these, polystyrene, polycarbonates, acrylic-based resins, PET, styrene-(meth)acrylic copolymers (MS polymers) and the like are preferable in terms of optical properties such as refractive index and transparency, and workability.

The haze of the light guiding film is preferably 10% or less, more preferably 2% or less, particularly preferably 0.5% or less. When the haze is greater than 10%, the light guiding efficiency and the light concentration efficiency with which incident light is controlled and collected may decrease considerably.

Here, the term "haze" refers to a value related to an extent of cloudiness and is evaluated using, for example, a measuring apparatus such as a haze meter (type: HZ-1, manufactured by Suga Test Instruments Co., Ltd.) based upon JIS 7105.

<Light Entrance Portion>

The light entrance portion allows incident light from a light source to enter.

The light source is not particularly limited and may be suitably selected according to the intended purpose. Examples thereof include the sun (natural light) and artificial light sources such as LEDs and halogen lamps.

The light entrance portion is not particularly limited. It is preferred that the light entrance portion include a light entrance surface formed on a surface of the film with respect to the lengthwise direction of the film.

When the incident light is received through the light entrance surface, light reception with a large area is enabled.

The length of the light entrance portion is not particularly limited and may be suitably changed according to the purpose of the use. For example, the length is preferably in the range of 1 mm to 5,000 mm, more preferably 5 mm to 1,000 mm, particularly preferably 20 mm to 500 mm.

When the length is less than 1 mm, the amount of incident light may be too small. When the length is greater than 5,000 mm, there may be too much loss of light absorption by the film.

The refractive index of the light at the light entrance portion is not particularly limited but is preferably in the range of 1.05 to 1.8, more preferably 1.1 to 1.75, particularly preferably 1.2 to 1.7, most preferably 1.3 to 1.65.

When the refractive index is less than 1.05, the critical angle may be too large and thus most of the light travelling inside the film may leak. When the refractive index is greater than 1.8, the extent of interfacial reflection is great and thus the quantity of light incident into the film may greatly decrease.

In the case where a member including an end of the light guiding film serves as the light entrance portion, a reflective layer is preferably formed on the surface at the aforementioned end (the surface with respect to the thickness direction of the light guiding film) in view of enclosure of the light that has entered from the light entrance portion.

Also, in the case where the light entrance portion is formed at a site other than the end of the light guiding film, for example at a central portion of the light guiding film, reflective layer(s) may be provided on surface(s) of the light entrance portion with respect to the thickness direction of the light guiding film, in other words on side surface(s) of the light entrance portion (in the case where the light guiding portion is included in the light guiding film, the reflective layer(s) may be provided on side surface(s) of the light guiding portion as well, if necessary).

The material forming the reflective layer(s) is not particularly limited as long as it has high reflectance, and it may be suitably selected according to the intended purpose. Examples of the material include metals such as silver, aluminum, gold, copper and magnesium, semiconductors and dielectric materials with high refractive indices such as $TiO_2$, ZnS and silicone.

<Wavelength Converting Portion>

The wavelength converting portion absorbs the incident light and converts the wavelength of the incident light to a wavelength utilizable for growth of a plant.

The position where the wavelength converting portion is formed is not particularly limited as long as it is placed on an optical path of the light entering from the light entrance portion. It is preferred that the wavelength converting portion be formed on a surface of the light entrance portion on the opposite side to the light entrance surface.

The converted wavelength at the wavelength converting portion is not particularly limited. Nevertheless, the relationship $\lambda_1 < \lambda_2$ is preferably satisfied, where $\lambda_1$ (nm) denotes a peak wavelength of light absorbed by the wavelength converting portion, and $\lambda_2$ (nm) denotes a peak wavelength of the light with a converted wavelength.

The incident light, the light source of which is the sun, etc., has a peak wavelength on the shorter wavelength side than the wavelength of light necessary for photosynthesis of a plant; when this incident light is highly efficiently absorbed and the light with the converted wavelength has a peak wavelength on the longer wavelength side, the light has a peak wavelength at the wavelength of the light necessary for photosynthesis of the plant, and thus the plant can be efficiently grown.

The peak wavelength $\lambda_1$ (nm) is preferably in the range of 300 nm to 700 nm, and the peak wavelength $\lambda_2$ (nm) is preferably in the range of 400 nm to 1,000 nm.

Specifically, chlorophyll α, which is generally contained in plants and has the function of absorbing light energy, absorbs light having peak wavelengths in the vicinities of 420 nm and 660 nm; for photosynthesis, light having a peak wavelength in the vicinity of 660 nm is utilized. In the case where light from a light source such as the sun is directly absorbed, light in a short wavelength region, other than the light having a peak wavelength in the vicinity of 660 nm, yields poor photosynthetic efficiency. In the present invention, converting the wavelength of such incident light to a wavelength utilizable for growth of a plant and using the light with the converted wavelength for the growth of the plant is a technical core.

A means of converting the wavelength (hereinafter referred to as "wavelength converting means") at the wavelength converting portion is not particularly limited and may be suitably selected according to the intended purpose. It is preferred that the means be a fluorescent material which absorbs incident light and then emits light having a wavelength utilizable for growth of a plant.

The fluorescent material is not particularly limited as long as it can increase the amount of light having a required wavelength, and it may be suitably selected according to the intended purpose. Examples thereof include fluorescent compounds such as DCM, DMETCI, DOCI, DODCI, DQOCI, DQTCI and HIDCI; indolenine, coumarin, cresyl violet, cyanine, fluorescein, malachite green, Nile blue, oxazine, perylene compounds, phenoxazone, phenylalanine, phthalocyanine, pyocyanin, porphin, proflavin, pyridine, pyrromethene, rhodamines, riboflavin, stilbene, styryl compounds, sulforhodamines and uranine. Among these, perylene compounds are preferable, and the perylene compounds are not particularly limited as long as they emit fluorescence, with specific examples thereof including perylene, perylene red and perylene orange.

Examples of the fluorescent material include, but are not limited to, the following compounds. In the structural formulae below, "Et" denotes ethanol, and "Bt" denotes butanol.

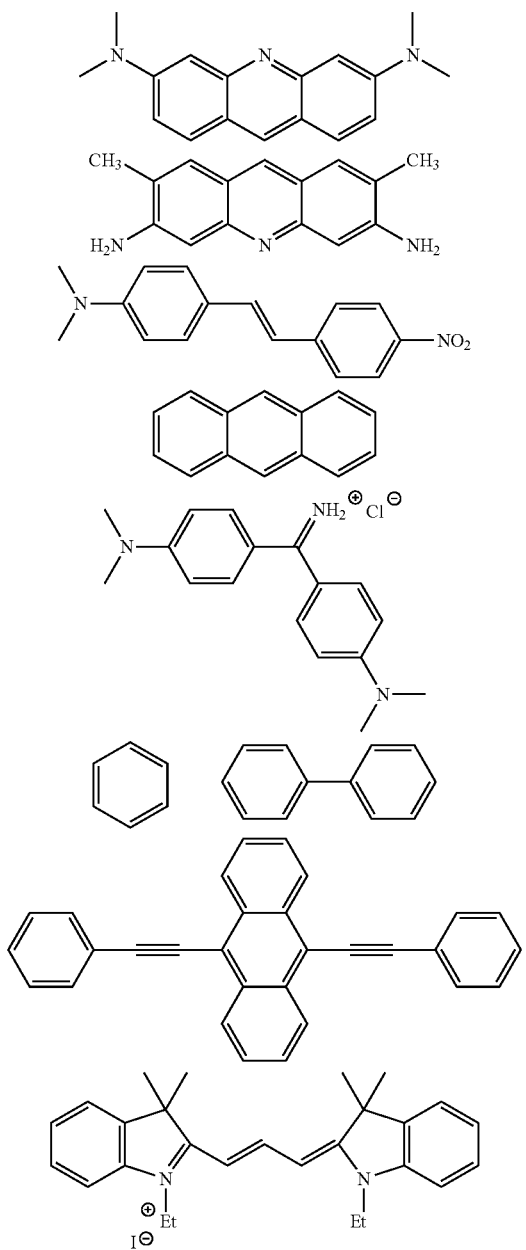

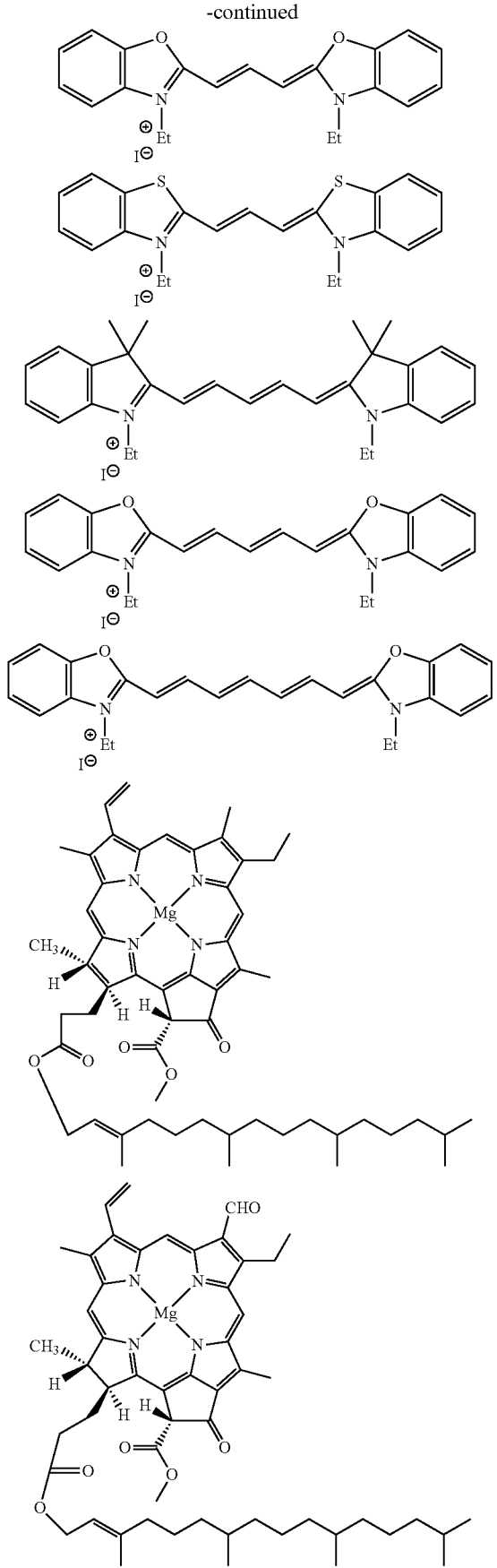
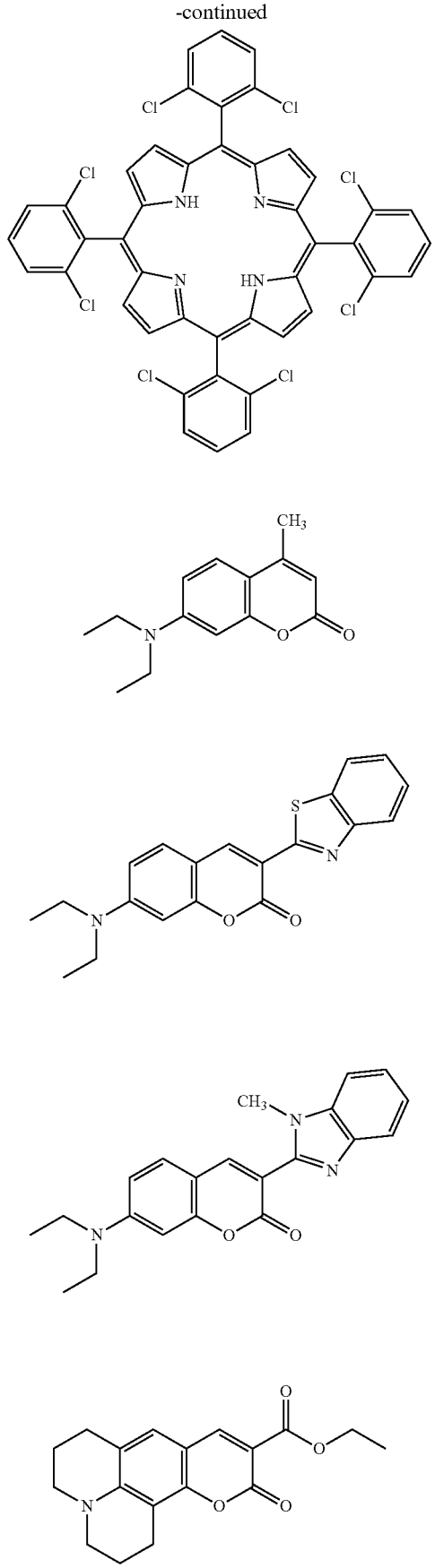

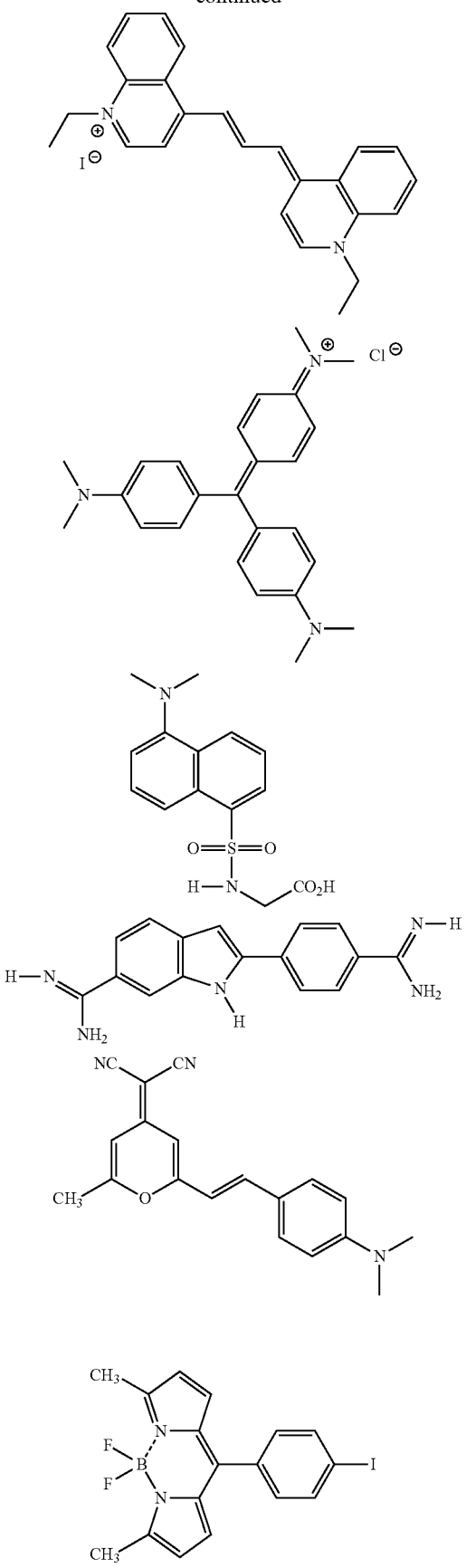
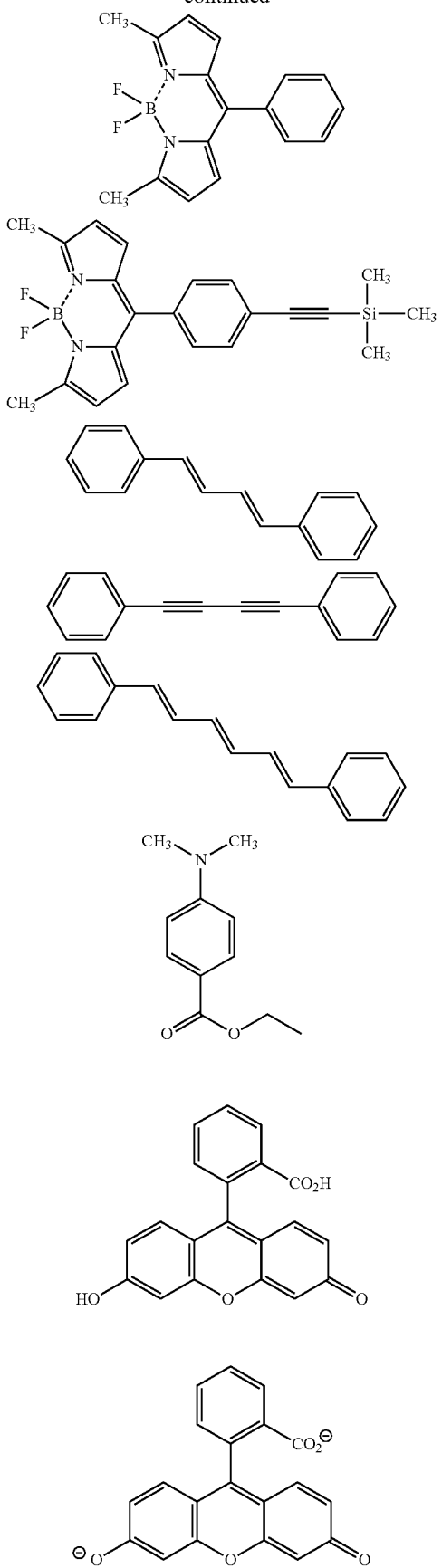

11
-continued
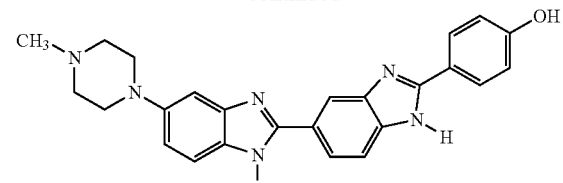
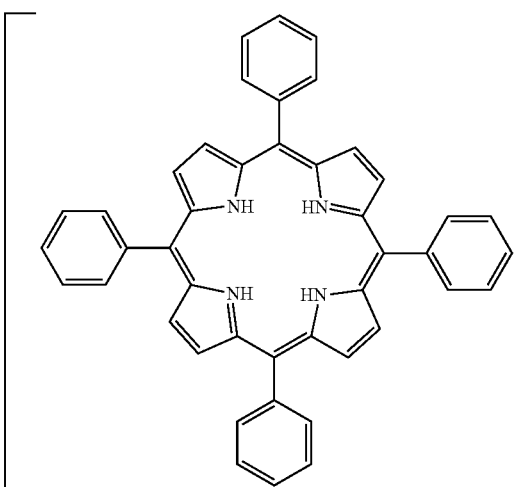
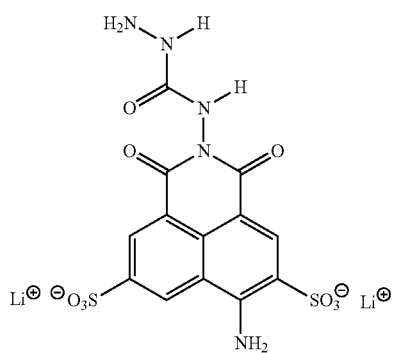
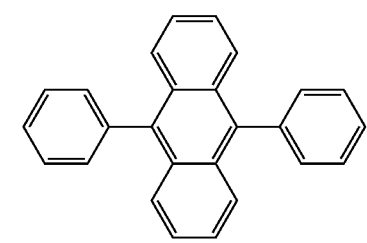
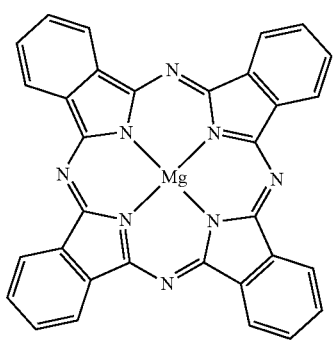
12
-continued
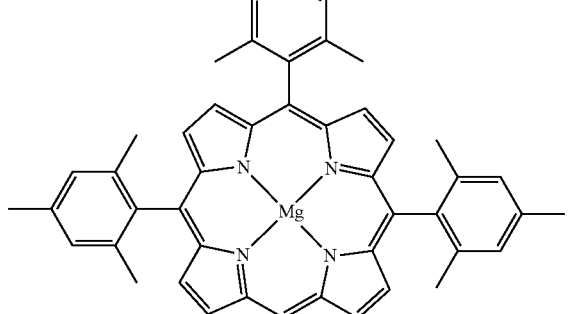
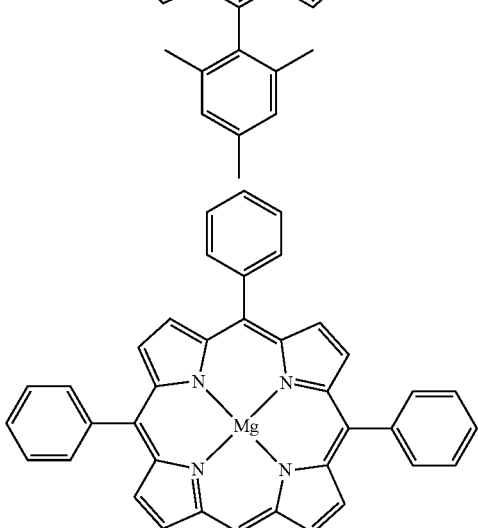
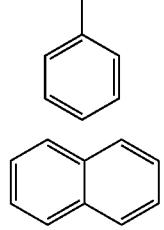
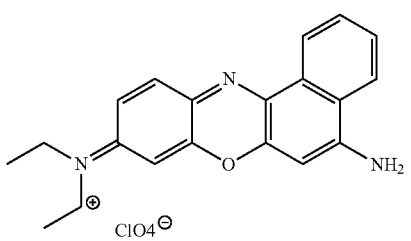
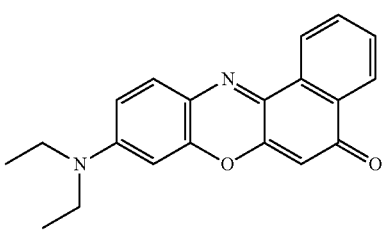

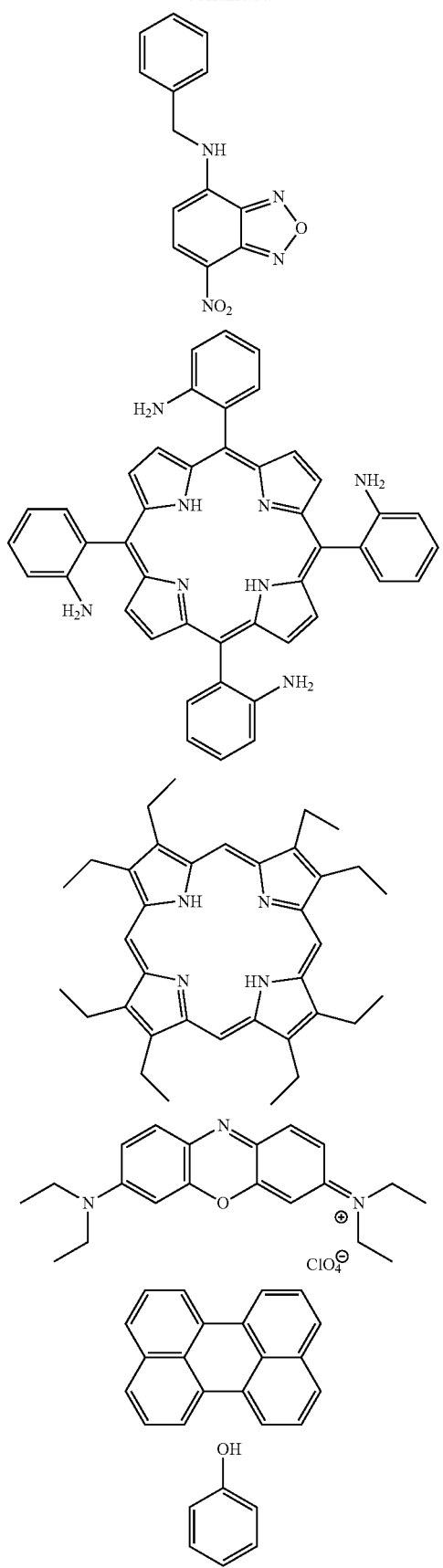
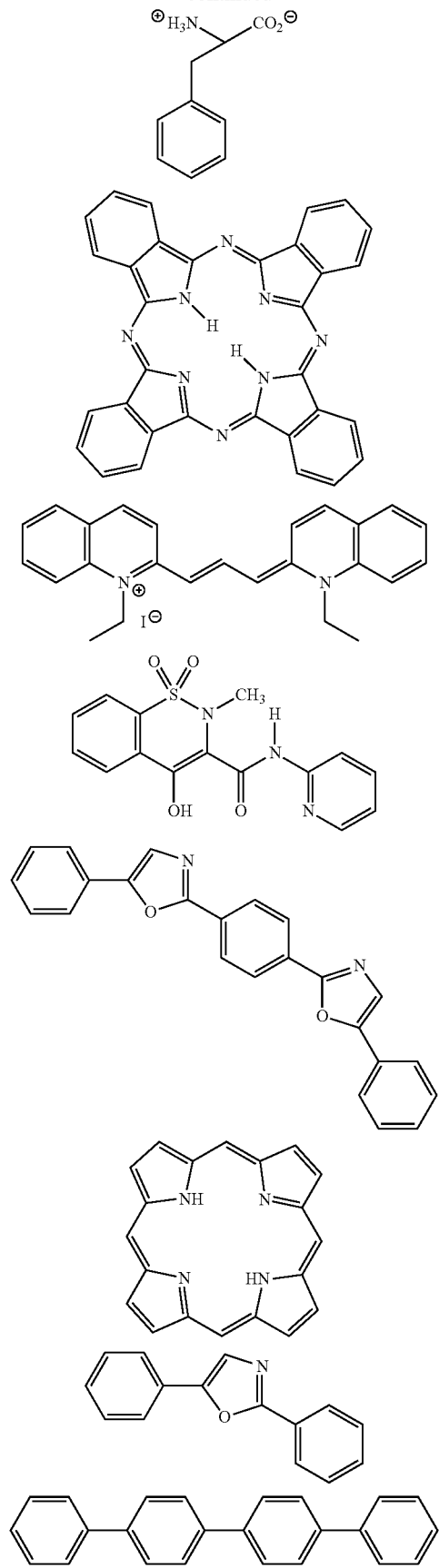

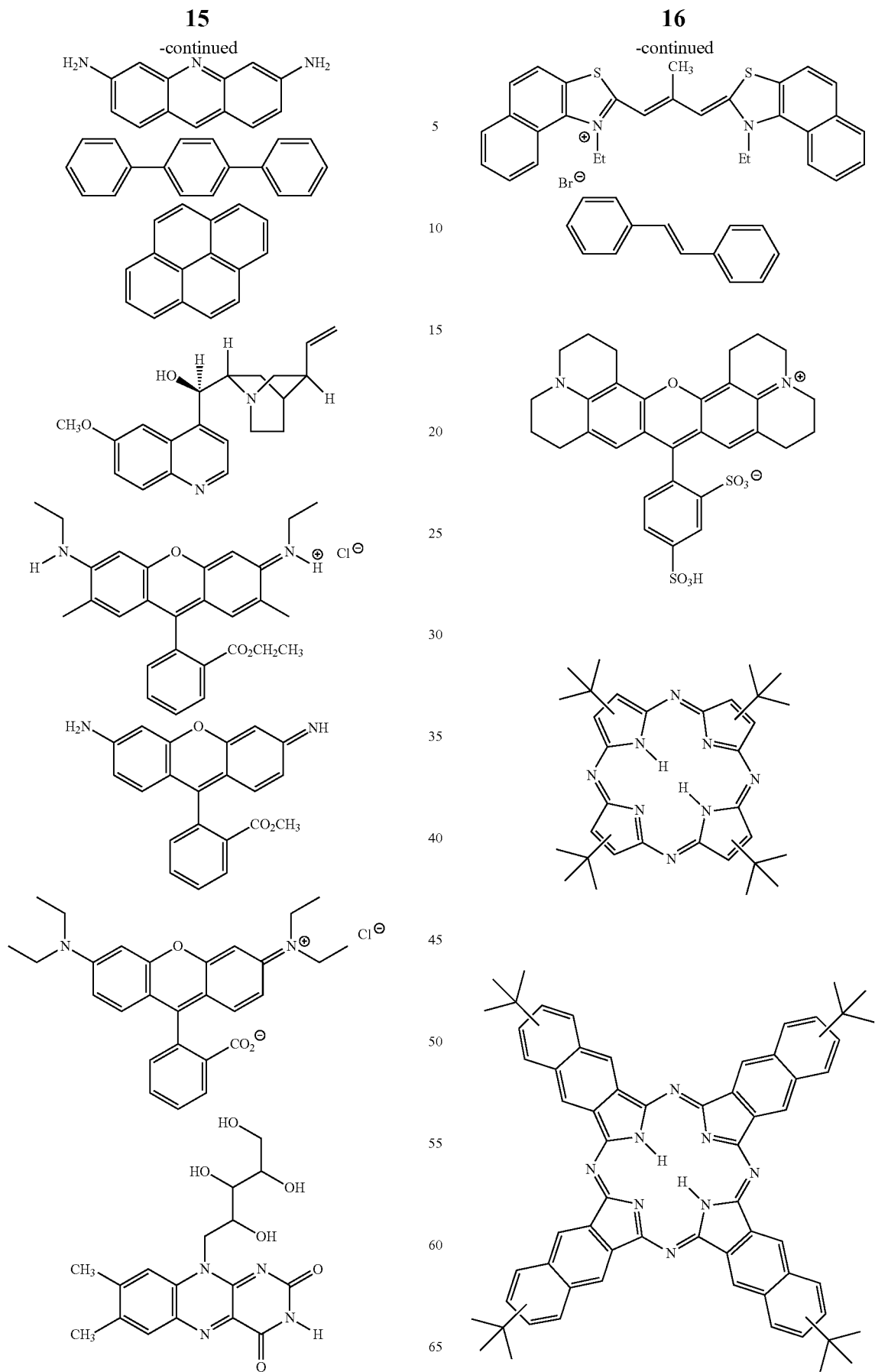

17
-continued
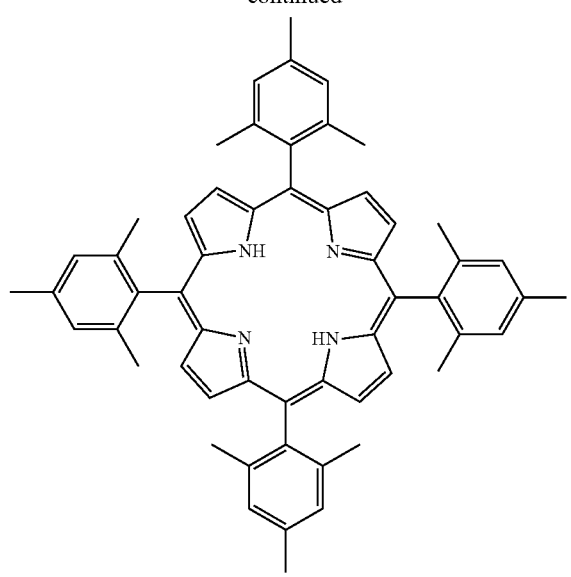
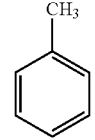
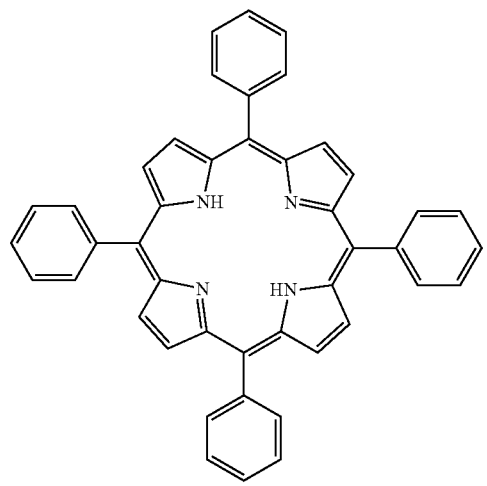
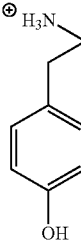
18
-continued
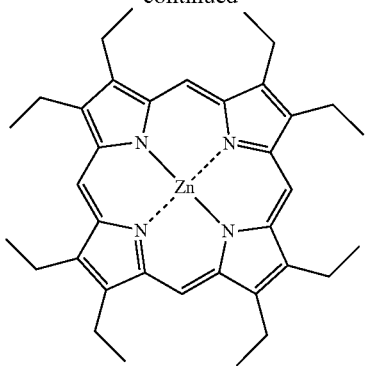
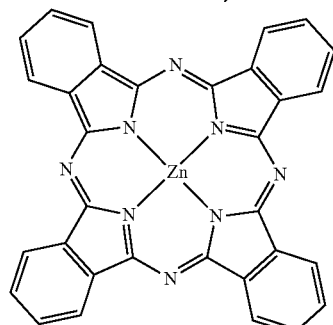
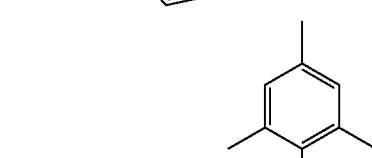
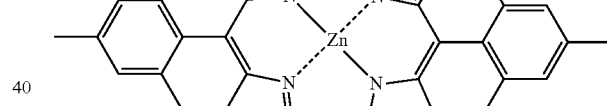

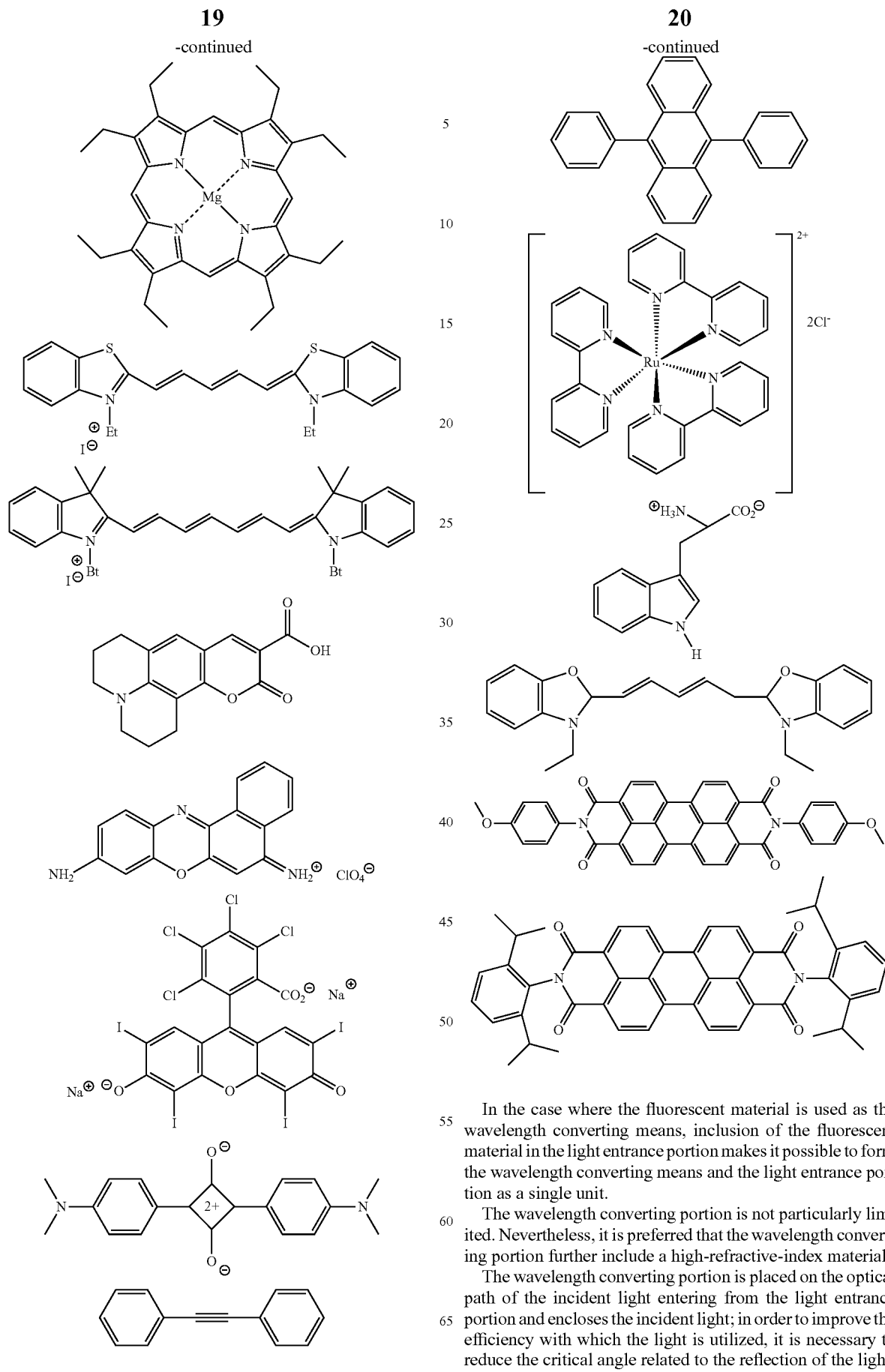

In the case where the fluorescent material is used as the wavelength converting means, inclusion of the fluorescent material in the light entrance portion makes it possible to form the wavelength converting means and the light entrance portion as a single unit.

The wavelength converting portion is not particularly limited. Nevertheless, it is preferred that the wavelength converting portion further include a high-refractive-index material.

The wavelength converting portion is placed on the optical path of the incident light entering from the light entrance portion and encloses the incident light; in order to improve the efficiency with which the light is utilized, it is necessary to reduce the critical angle related to the reflection of the light;

that is, the refractive index of the wavelength converting portion is preferably greater than that of the light entrance portion.

In view of the foregoing, the refractive index of the wavelength converting portion with respect to the light is preferably 1.5 or greater, more preferably 1.55 or greater, particularly preferably 1.6 or greater.

It is preferred that the high-refractive-index material be higher than the light entrance portion (film main body) in refractive index and have a certain degree of strength. Examples of the high-refractive-index material include resins containing high-refractive-index fine particles such as of $TiO_2$ and ZnS, and high-refractive-index resins.

The refractive index difference (A−B) between the refractive index A of the wavelength converting portion and the refractive index B of the light entrance portion (film main body) is not particularly limited and may be suitably selected according to the intended purpose. For example, the difference is preferably in the range of 0.01 to 2, more preferably 0.05 to 1.5, particularly preferably 0.1 to 1. When the difference is less than 0.01, effects of enclosing the light may be hardly secured. When the difference is greater than 2, the incidence of the light to the wavelength converting portion may be too low.

The method for forming the wavelength converting portion is not particularly limited and may be suitably selected according to the intended purpose. For example, a method may be employed in which a coating solution obtained by dissolving the high-refractive-index material and the fluorescent material in solvent is applied to the surface on the opposite surface to the light entrance surface by spraying, spin coating, dipping, roll coating, blade coating, doctor rolling, doctor blading, screen printing, etc. and then dried.

The amount of the fluorescent material contained is not particularly limited and may be suitably selected according to the intended purpose. For example, the amount is preferably in the range of 0.001 mg to 20 mg, more preferably 0.01 mg to 10 mg, particularly preferably 0.1 mg to 5 mg, per 100 mg of the high-refractive-index material.

When the amount is less than 0.001 mg per 100 mg of the high-refractive-index material, the light having entered from the light entrance portion may not be able to be effectively converted to fluorescence. When the amount is greater than 20 mg per 100 mg of the high-refractive-index material, the shape of the fluorescent material may be difficult to maintain.

Minute concave and convex portions may be formed at the interface between the light entrance portion and the wavelength converting portion. With such minute concave and convex portions, it is possible to suppress decrease in the utilization efficiency of the light caused by the occurrence of interfacial reflection at the interface.

The method for forming the minute concave and convex portions is not particularly limited and may be suitably selected according to the intended purpose. Examples of the method include cutting, nanoimprinting, laser fine processing, and etching.

The lower limit of the pitch $P_1$ of the minute concave and convex portions with respect to a main emission wavelength is not particularly limited and may be suitably selected according to the intended purpose. In view of increase in the quantity of light, the lower limit thereof is preferably $0.01\lambda$ or greater, more preferably $0.05\lambda$ or greater, even more preferably $0.1\lambda$ or greater, particularly preferably $0.2\lambda$ or greater, where $\lambda$ denotes a main emission wavelength of the light source.

Also, in view of increase in the quantity of light, the upper limit thereof is preferably $10\lambda$ or less, more preferably $5\lambda$ or less, even more preferably $2\lambda$ or less, particularly preferably $1\lambda$ or less.

The lower limit of the shortest distance $P_1$ (pitch) between adjacent convex portions in the minute concave and convex portions is preferably 0.1 μm or greater, more preferably 0.15 μm or greater, particularly preferably 0.2 μm or greater. When the lower limit is less than 0.1 μm, processing is difficult and uniformity of the minute concave and convex portions may not be able to be secured.

The upper limit thereof is preferably 100 μm or less, more preferably 10 μm or less, particularly preferably 1 μm or less. When the upper limit thereof is greater than 100 μm, the effects of enclosing the light may lessen.

The lower limit of the height $H_1$ of convex portions in the minute concave and convex portions is preferably 0.05 μm or greater, more preferably 0.1 vim or greater, particularly preferably 0.15 μm or greater. When the lower limit is less than 0.05 μm, effects of reducing interfacial reflection may not be obtained.

The upper limit of the height $H_1$ of the convex portions in the minute concave and convex portions is preferably 100 μm or less, more preferably 10 μm or less, particularly preferably 1 μm or less. When the upper limit is greater than 100 μm, the effects of enclosing the light may lessen.

<Light Exit Portion>

The light exit portion allows the light with the converted wavelength to exit.

The length of the light exit portion is not particularly limited and may be suitably changed according to the purpose of the use. For example, the length is preferably in the range of 1 mm to 5,000 mm, more preferably 5 mm to 1,000 mm, particularly preferably 20 mm to 500 mm.

When the length is less than 1 mm, the amount of light exiting may be too small. When the length is greater than 5,000 mm, there may be too much loss of light absorption by the film.

The light exit portion is not particularly limited. It is preferred that at least part of its surface be provided with minute concave and convex portions.

With such minute concave and convex portions, the exit efficiency of the light improves, and the exit direction of the light can be controlled, which leads to an increase in the directivity of the light. Thus, it is possible to deliver the light farther.

The method for forming the minute concave and convex portions is not particularly limited. Examples thereof include sand blasting, cutting, nanoimprinting, laser fine processing, and etching.

In the case where the minute concave and convex portions are formed by the sand blasting, the surface roughness Ra of the minute concave and convex portions is not particularly limited but is preferably in the range of 0.001 μm to 1,000 μm, more preferably 0.01 μm to 100 μm, particularly preferably 0.1 μm to 10 μm.

When the surface roughness Ra is less than 0.001 μm, it may be impossible to allow the light to exit in various directions and, if there is overlapping of light guiding films, they may adhere to each other and may not easily detach from each other, which leads to poor handleability. When the surface roughness Ra is greater than 1,000 μm, the light guiding effects may be too poor.

In the case where the minute concave and convex portions are formed by the nanoimprinting, the shape thereof is not particularly limited, provided that the surface on the side where the light entrance portion lies is provided with a concavo-convex shape as a cross-sectional shape. For example, the minute concave and convex portions may have a concavo-convex shape such as the shape of cones, pyramids, a saw blade, bellows or squares. By appropriately changing the shape of the minute concave and convex portions, it is possible, for example, to increase luminance with respect to a specific direction and control the exit direction of the light.

The shortest distance $P_2$ (pitch) between adjacent convex portions in the minute concave and convex portions can be suitably changed according to the wavelength of the light with the converted wavelength. It is preferred that the pitch $P_2$ be in the range of $0.5 \times (\lambda/2n)$ to $1.5 \times (\lambda/2n)$, more preferably $0.6 \times (\lambda/2n)$ to $1.4 \times (\lambda/2n)$, particularly preferably $0.7 \times (\lambda/2n)$ to $1.3 \times (\lambda/2n)$, where n denotes the refractive index of the light exit portion (film main body). When the pitch $P_2$ is less than $0.5 \times (\lambda/2n)$, the pitch is so small that the interaction of the light decreases and thus the effects may lessen. When the pitch $P_2$ is greater than $1.5 \times (\lambda/2n)$, the angle by which the light changes is small and thus the effects may lessen.

The lower limit of the height $H_2$ of convex portions in the minute concave and convex portions is preferably 0.05 μm or greater, more preferably 0.1 μm or greater, particularly preferably 0.15 μm or greater. When the lower limit thereof is less than 0.05 μm, the interaction of the light may greatly decrease and thus the effects may lessen.

The upper limit thereof is preferably 10 μm or less, more preferably 4 μm or less, particularly preferably 1 μm or less. When the upper limit thereof is greater than 10 μm, the strength of the minute concave and convex portions decreases and thus the shape thereof may not be maintained.

In the nanoimprinting as a method for forming the minute concave and convex portions at the light entrance portion and the light exit portion, a minute concavo-convex configuration can be formed by transferring a desired concavo-convex shape provided on a stamper (die) in advance. Specifically, a stamper original plate (silicon substrate) is coated with a photoresist layer made of a photoresist material by spin coating or the like, a plurality of minute holes are formed in the photoresist layer by applying laser light through an optical lens in such a manner as to concentrate on the photoresist layer, an etching treatment such as reactive ion etching (RIE) is carried out, the depth of minute holes formed in the original plate is adjusted, then the photoresist layer is removed, and a stamper having a desired concavo-convex shape is thus produced.

A nanoimprinting layer made of a nanoimprinting material is formed on the surface lying on the opposite side to the surface of the light entrance portion that allows the light to enter, then the stamper is pressed against this nanoimprinting layer, with heating or light irradiation if necessary, and the minute concavo-convex configuration is thus formed.

The photoresist material is not particularly limited and may be suitably selected according to the intended purpose. Examples thereof include ordinary photoresist materials for use with photoreaction and ordinary photoresist materials for use with thermal reaction. Preference is given to photoresist materials which can be suitably used with thermal reaction because they can form a high-definition shape, create a fine structure around the concavo-convex configuration and exhibit great effects on optical interaction.

Examples of the photoresist materials which can be suitably used with thermal reaction include methine pigments (such as cyanine pigments, hemicyanine pigments, styryl pigments, oxonol pigments and merocyanine pigments), macrocyclic pigments (such as phthalocyanine pigments, naphthalocyanine pigments and porphyrin pigments), azo pigments (including azo metal chelate pigments), allylidene pigments, complex pigments, coumarin pigments, azole derivatives, triazine derivatives, 1-aminobutadiene derivatives, transcutaneous acid derivatives and quinophthalone pigments.

The nanoimprinting material is not particularly limited and may be suitably selected according to the intended purpose. Examples thereof include an imprint resist composition containing at least one of a thermoplastic resin and a photocurable resin.

Examples of the imprint resist composition include novolac resins, epoxy resins, acrylic resins, organic glass resins and inorganic glass resins.

It is preferred that the thickness of the photoresist layer be 5% or more, but less than 200% of the height of convex portions formed on the surface of the stamper.

When the thickness is less than 5% of the height, the amount of the resist may be insufficient and thus it may be impossible to form a desired minute concavo-convex configuration.

Regarding of the thickness of the photoresist layer, it can be determined, for example, by peeling off part of the photoresist layer formed on the light entrance portion, and measuring the level difference (height) after the peeling, using an AFM apparatus (OLS, manufactured by Olympus Corporation).

The viscosity of the imprint resist composition at 25° C. is preferably in the range of 1 mPa·s to 200 mPa·s, more preferably 1 mPa·s to 100 mPa·s.

The viscosity of the imprint resist composition can be measured, for example using an ultrasonic viscometer or the like.

The wavelength converting portion can be formed by applying a solution, obtained by dissolving a high-refractive-index material and a fluorescent material in solvent, over the minute concavo-convex configuration after the formation of the minute concavo-convex configuration, in accordance with a method such as spraying, spin coating, dipping, roll coating, blade coating, doctor rolling, doctor blading or screen printing.

<Light Guiding Portion>

Placed between the light entrance portion and the light exit portion, the light guiding portion guides the light, whose wavelength has been converted by the wavelength converting portion, to the light exit portion and enables the length of the light guiding film to be suitably changed.

The length of the light guiding portion is not particularly limited and may be suitably changed according to the purpose of the use. For example, the length is preferably in the range of 10 mm to 10,000 mm, more preferably 100 mm to 5,000 mm, particularly preferably 500 mm to 2,000 mm. When the length is less than 10 mm, the quantity of light able to be guided may be small relative to the length of light guiding, and thus there may be a decrease in efficiency. When the length is greater than 10,000 mm, the quantity of light may decrease owing to loss of light in the midst of light guiding.

First Embodiment

Figure 2:
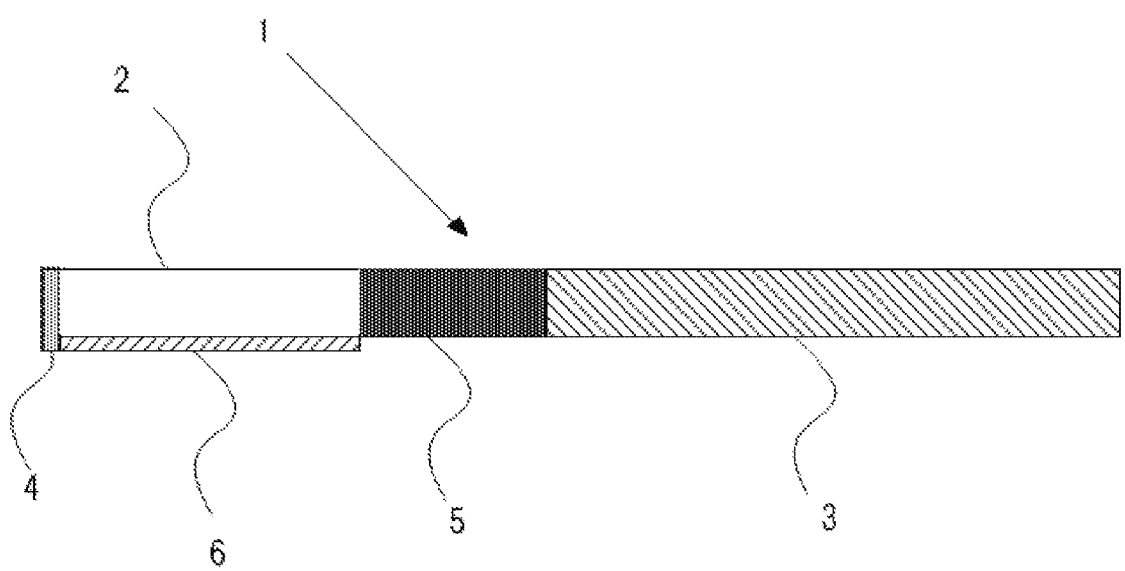
FIG. 2 is a cross-sectional view of the light guiding film according to the first embodiment.

FIG. 1 is a plan view of a light guiding film according to a first embodiment, and FIG. 2 is a cross-sectional view of the light guiding film according to the first embodiment.

A light guiding film 1 according to the first embodiment includes: a light entrance portion 2 an entire surface of which allows light, emitted from a light source, to enter; a wavelength converting portion 6 which is placed at the surface on the opposite side to the light entrance portion 2 and converts the wavelength of the light having entered from the light entrance portion 2 to a wavelength utilizable for growth of a plant; a light exit portion 3 which allows the light, whose wavelength has been converted by the wavelength converting portion 6, to exit to the outside; a light guiding portion 5 which is situated between the light entrance portion 2 and the light exit portion 3 and guides the light, whose wavelength has been converted by the wavelength converting portion 6, to the light exit portion 3; and a reflective layer 4 which is provided at the end (on the side of the light entrance portion 2) of the light guiding film 1 and which makes redirects the light enclosed in the light guiding film 1 and enables the light to exit efficiently from the light exit portion 3. The reflective layer 4 may also be provided on side surfaces of the light entrance portion 2 and the light guiding portion 5. Also in this embodiment, a fluorescent material is used as a wavelength converting means in the wavelength converting portion 6.

The incident light which has entered from a light entrance surface of the light entrance portion 2 is guided to the wavelength converting portion 6 positioned on the light path of the incident light. By the incident light guided to the wavelength converting portion 6, the fluorescent material is excited, the wavelength of the incident light is converted to a wavelength (in the vicinity of 660 nm) utilizable for growth of a plant, and the light is fluorescently emitted. The fluorescently emitted light is guided to the light exit portion 3 via the light entrance portion 2 and the light guiding portion 5. Here, in the case where the materials forming the light entrance portion 2 and the light guiding portion 5 are high-refractive-index materials, it is possible to enclose the light by means of total reflection effected by the difference in refractive index between the outside (air) and the materials and thus to suppress light leakage. The light guided to the light exit portion 3 exits to the outside of the light exit portion 3. When the outside of the light exit portion 3 is an aqueous phase, the light is allowed to exit to the outside, based upon the difference in refractive index between the outside and the material forming the light exit portion 3. In the case where algae is grown, the light exit portion 3 is inserted into an algae-containing aqueous phase.

Regarding the foregoing light guiding film 1 according to the first embodiment, by converting the wavelength of incident light, emitted from a light source, to a wavelength utilizable for growth of a plant and allowing only the light necessary for the growth of the plant to exit, the growth of the plant can be promoted without hindering the growth, and further, the light necessary for the growth of the plant is enabled to exit highly efficiently with respect to the incident light.

Second Embodiment

Figure 3:
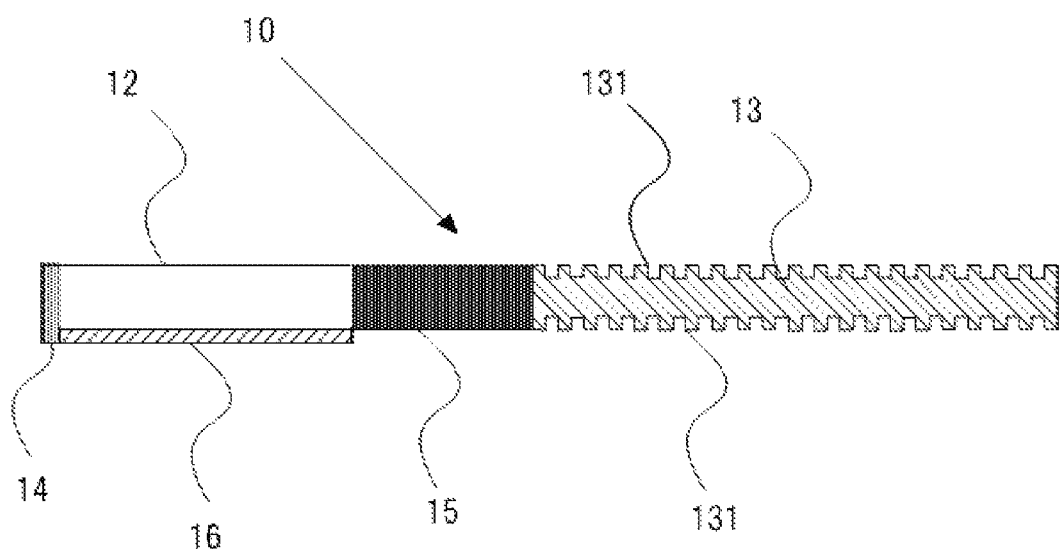
FIG. 3 is a cross-sectional view of a light guiding film according to a second embodiment.
Figure 4:
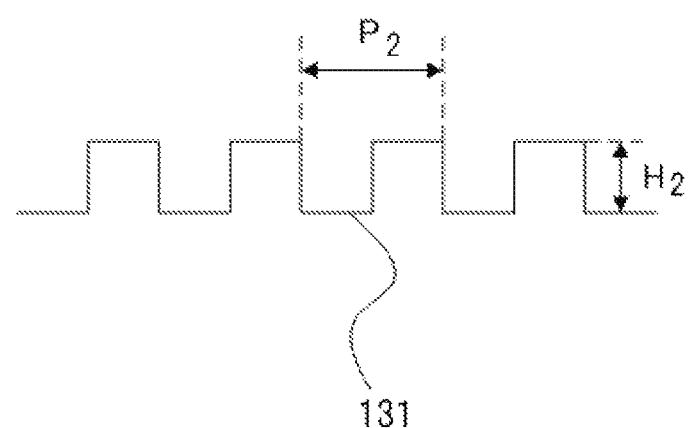
FIG. 4 is an enlarged drawing of minute concave and convex portions formed at a surface of a light exit portion.

FIG. 3 is a cross-sectional view of a light guiding film according to a second embodiment, and FIG. 4 is an enlarged drawing of minute concave and convex portions formed at a surface of a light exit portion.

A light guiding film 10 according to the second embodiment includes: a light entrance portion 12 an entire surface of which allows light, emitted from a light source, to enter; a wavelength converting portion 16 which is placed at the surface on the opposite side to the light entrance portion 12 and converts the wavelength of the light having entered from the light entrance portion 12 to a wavelength utilizable for growth of a plant; a light exit portion 13 which allows the light, whose wavelength has been converted by the wavelength converting portion 16, to exit to the outside; a light guiding portion 15 which is situated between the light entrance portion 12 and the light exit portion 13 and guides the light, whose wavelength has been converted by the wavelength converting portion 16, to the light exit portion 13; and a reflective layer 14 which is provided at the end (on the side of the light entrance portion 12) of the light guiding film 10 and which makes the light enclosed in the light guiding film 10 and enables the light to exit efficiently from the light exit portion 13. Further, in order to allow the light to exit highly efficiently from the light exit portion 13 and also to control the exit direction of the light, improve the directivity of the light and thereby deliver the light farther, minute concave and convex portions 131 are formed at least part of the surfaces of the light exit portion 13.

Here, the minute concave and convex portions 131 can be formed as a shape with the surface roughness Ra adjusted to the above-mentioned desired range by surface treatment in accordance with the sand blasting; also, they can be formed as a shape with the pitch ($P_2$) and the height ($H_2$) of convex portions adjusted to the above-mentioned desired ranges by the nanoimprinting.

Regarding the foregoing light guiding film 10 according to the second embodiment, it is possible to allow the light to exit highly efficiently from the light exit portion 13 and also to control the exit direction of the light, improve the directivity of the light and thereby deliver the light farther; hence, the light guiding film can be very suitably used to grow a plant.

Explanations of other points regarding the second embodiment are omitted, since they do not differ from those regarding the first embodiment.

Third Embodiment

Figure 5:
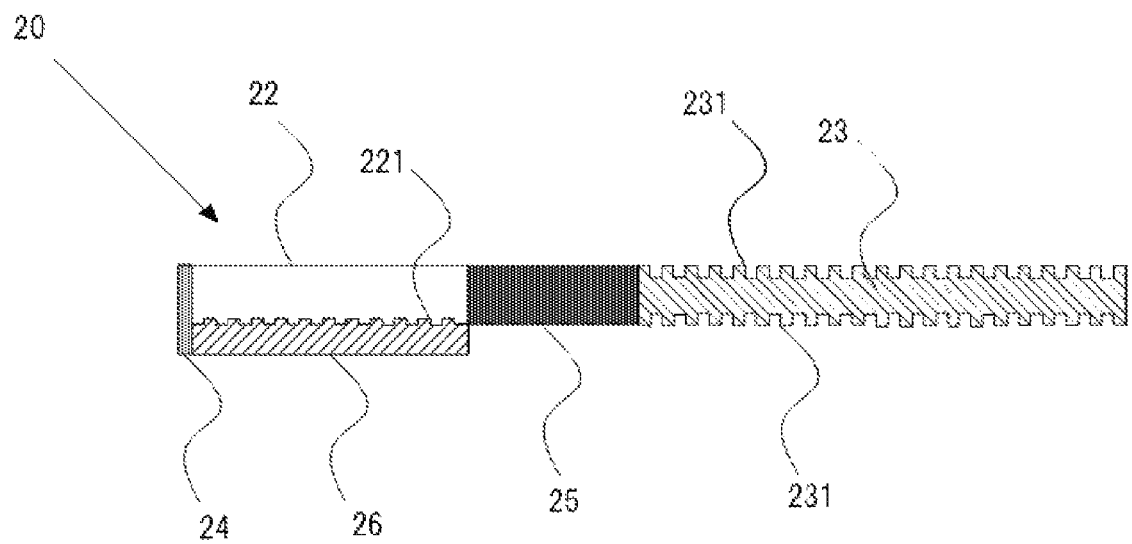
FIG. 5 is a cross-sectional view of a light guiding film according to a third embodiment.
Figure 6:
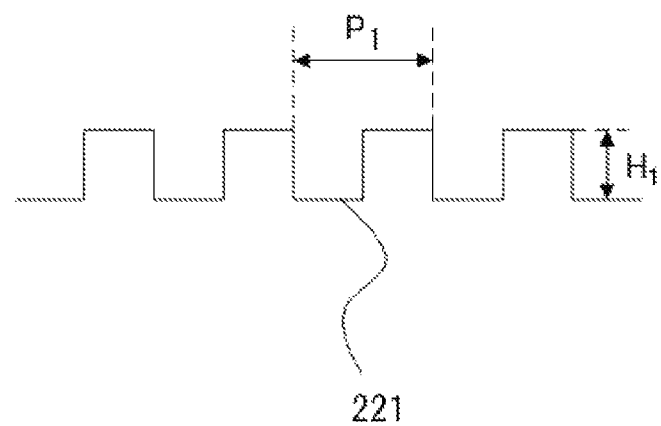
FIG. 6 is an enlarged drawing of minute concave and convex portions formed at the interface between a light entrance portion and a wavelength converting portion.

FIG. 5 is a cross-sectional view of a light guiding film according to a third embodiment, and FIG. 6 is an enlarged drawing of minute concave and convex portions formed at the interface between a light entrance portion and a wavelength converting portion.

A light guiding film 20 according to the third embodiment includes: a light entrance portion 22 an entire surface of which allows light, emitted from a light source, to enter; a wavelength converting portion 26 which is placed at the surface on the opposite side to the light entrance portion 22 and converts the wavelength of the light having entered from the light entrance portion 22 to a wavelength utilizable for growth of a plant; a light exit portion 23 which allows the light, whose wavelength has been converted by the wavelength converting portion 26, to exit to the outside; a light guiding portion 25 which is situated between the light entrance portion 22 and the light exit portion 23 and guides the light, whose wavelength has been converted by the wavelength converting portion 26, to the light exit portion 23; and a reflective layer 24 which is provided at the end (on the side of the light entrance portion 22) of the light guiding film 20 and which makes the light enclosed in the light guiding film 20 and enables the light to exit efficiently from the light exit portion 23. Also, minute concave and convex portions 231 are formed at least part of the surfaces of the light exit portion 23. Further, in order to make the light enclosed in the light guiding film 20 and enable the light to exit highly efficiently from the light exit portion 23, minute concave and convex portions 221 are formed at the interface between the light entrance portion 22 and the wavelength converting portion 26. Additionally, if necessary, the wavelength converting portion 26 contains a high-refractive-index material.

Here, the minute concave and convex portions 221 can be formed as a shape with the pitch ($P_1$) and the height ($H_1$) of convex portions adjusted to the above-mentioned desired ranges by the nanoimprinting.

Regarding the foregoing light guiding film 20 according to the third embodiment, by adjusting the optical path of the light having entered the light guiding film 20, the light can be enclosed in the light guiding film 20 and the light is enabled to exit highly efficiently from the light exit portion 23; hence, the light guiding film can be very suitably used to grow a plant.

Explanations of other points regarding the third embodiment are omitted, since they do not differ from those regarding the second embodiment.

Fourth Embodiment

Figure 7:
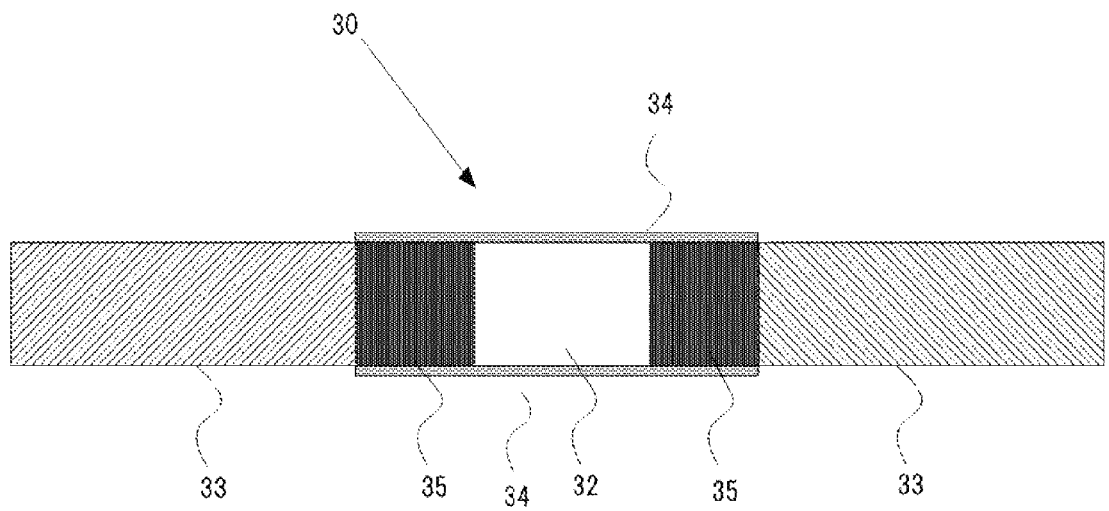
FIG. 7 is a plan view of a light guiding film according to a fourth embodiment.
Figure 8:
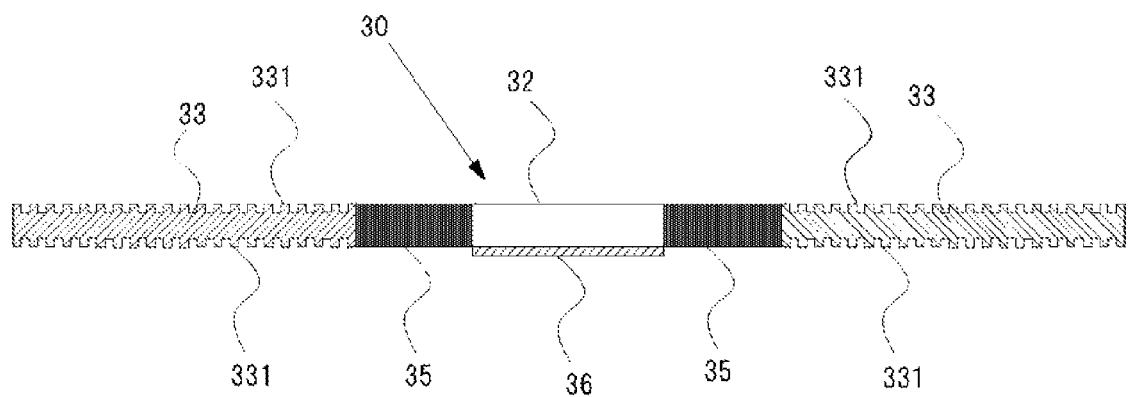
FIG. 8 is a cross-sectional view of the light guiding film according to the fourth embodiment.

FIG. 7 is a plan view of a light guiding film according to a fourth embodiment, and FIG. 8 is a cross-sectional view of the light guiding film according to the fourth embodiment.

A light guiding film 30 according to the fourth embodiment includes: a light entrance portion 32 an entire surface of which allows light, emitted from a light source, to enter; a wavelength converting portion 36 which is placed at the surface on the opposite side to the light entrance portion 32 and converts the wavelength of the light having entered from the light entrance portion 32 to a wavelength utilizable for growth of a plant; light exit portions 33, each of which allows the light, whose wavelength has been converted by the wavelength converting portion 36, to exit to the outside; light guiding portions 35, each of which is situated between the light entrance portion 32 and the light exit portion 33 and guides the light, whose wavelength has been converted by the wavelength converting portion 36, to the light exit portion 33. Also, minute concave and convex portions 331 are formed at least part of the surfaces of the light exit portions 33, and further, the light exit portions 33 and the light guiding portions 35 are placed on both sides (with respect to the lengthwise direction of the film) of the light entrance portion 32. Also, reflective layers 34 are placed at side surfaces of the light entrance portion 32 and the light guiding portions 35.

Regarding the foregoing light guiding film 30 according to the fourth embodiment, the light exit portions 33 can be suitably placed at a place for growth of a plant, in a manner that conforms to the form of the place.

Explanations of other points regarding the fourth embodiment are omitted, since they do not differ from those regarding the first embodiment. Also, the structures of the light entrance portion 32, the wavelength converting portion 36 and the light exit portions 33 in the fourth embodiment may be suitably changed to those of the corresponding members in the second and third embodiments.

(Plant Growing Method)

A plant growing method of the present invention is a method which includes growing a plant using the aforesaid light guiding film of the present invention, wherein the wavelength of light which has entered from the light entrance portion of the light guiding film is converted to a wavelength utilizable for growth of the plant, and the light exit portion of the light guiding film is placed so as to allow the light with the converted wavelength to exit from the light exit portion to a place for the growth of the plant.

The place for the growth of the plant is not particularly limited, and examples thereof include a greenhouse for cultivating a vegetable, etc., and a water area for growing algae including microalgae, with the water area for growing algae including microalgae being a particularly suitable example.

In the water area for growing algae including microalgae, if the water surface is filled with the algae, there exists the following problem: light from a light source excessively enters the algae in the vicinity of the water surface and thus growth of the algae is hindered; meanwhile, the light from the light source does not sufficiently reach the algae lying under the water surface and thus growth of the algae is also hindered.

In the present invention, as a countermeasure against such a problem, the light exit portion of the light guiding film is inserted through the water surface filled with the algae; in this state, light having entered from the light entrance portion of the light guiding film is guided with its wavelength converted to a wavelength utilizable for growth of a plant, and the light is made to exit from the light exit portion, thereby making it possible to noticeably promote growth of the algae under the water surface.

Now, the plant growing method in the water area for growing algae including microalgae is explained referring to a drawing.

Figure 9:
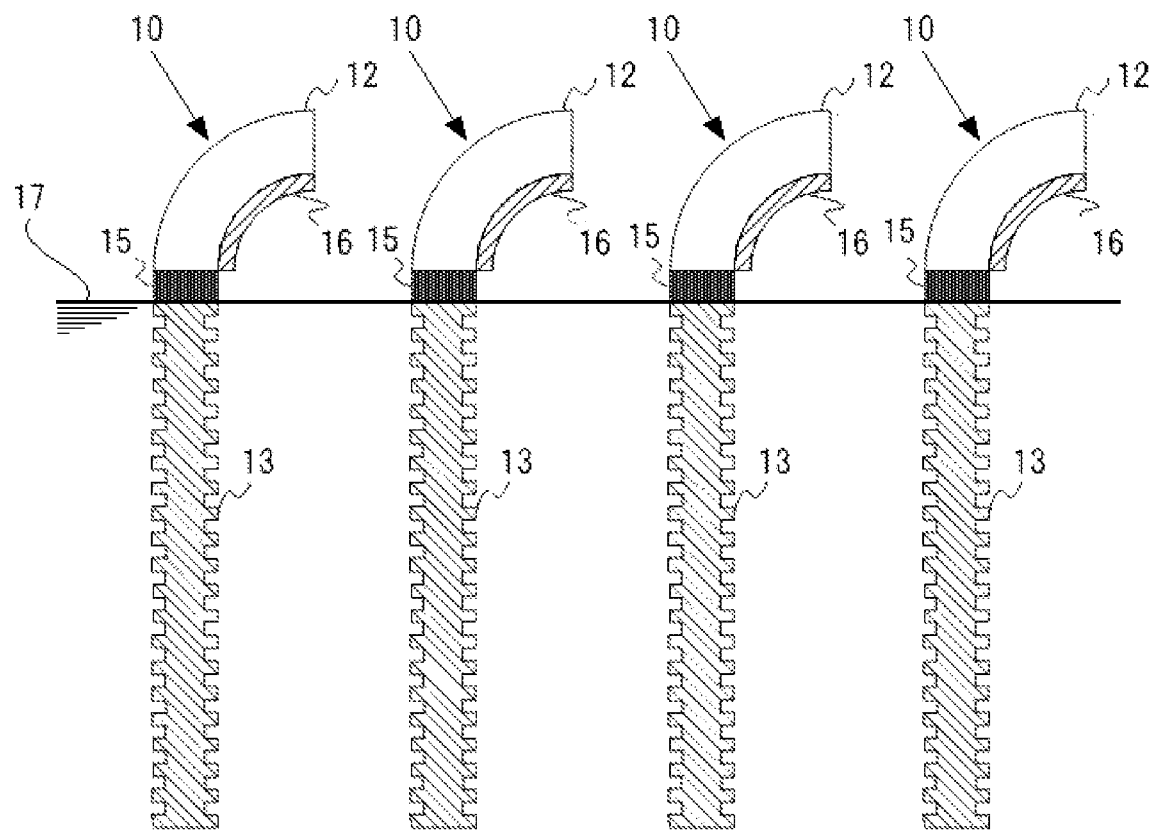
FIG. 9 is a schematic drawing showing an example of a plant growing method of the present invention.

FIG. 9 is a schematic drawing showing an example of a plant growing method of the present invention. Here, explanations involving use of the light guiding film 10 according to the second embodiment of the light guiding film of the present invention are made; it should, however, be noted that other light guiding films as well as the foregoing light guiding film are usable in the plant growing method of the present invention.

The light entrance portion 12, an end of which is fixed, the wavelength converting portion 16 and the light guiding portion 15 are placed over a water surface 17, the wavelength of incident light from a light source is converted to a wavelength utilizable for growth of a plant as the light passes through the light entrance portion 12, the wavelength converting portion 16 and the light guiding portion 15, and the light with the converted wavelength is made to exit from the light exit portion 13. On this occasion, the light exit portion 13 is placed into water (as a place for growth of a plant) under the water surface filled with algae including microalgae. Also, a plurality of the light guiding films 10 are disposed at predetermined intervals such that the light exiting from the respective light exit portions 13 sufficiently reaches the entire algae under the water surface.

The foregoing plant growing method makes it possible to solve the problem in which growth of the algae in the vicinity of the water surface is hindered because light from a light source excessively enters the algae, and also solve the problem in which growth of the algae under the water surface is hindered because the light from the light source does not sufficiently reach the algae, thereby making it possible to noticeably promote growth of the algae under the water surface.

EXAMPLES

The following explains Examples of the present invention. It should, however, be noted that the scope of the present invention is not confined to these Examples.

Example 1

Light Entrance Portion and Light Exit Portion

An acrylic film (SOFTACRYL, manufactured by Shinko AG) having a length of 100 mm, a width of 40 mm, a thickness of 0.2 mm and a refractive index of 1.5 was used, an area extending from one end of the film for 30 mm with respect to the lengthwise direction of the film was made a light entrance portion, and an area extending from the other end of the film for 50 mm with respect to the lengthwise direction of the film was made a light exit portion.

Aluminum tape was affixed to end surfaces (with respect to the thickness direction of the film) in areas except the light exit portion so as to form reflective layers.

—Formation of Wavelength Converting Portion—

Using a brush, a solution obtained by dissolving 2% by mass of perylene red (LUMOGEN F RED 305, manufactured by BASF SE) as a fluorescent material and 20% by mass of BPEFA (manufactured by Osaka Gas Chemicals Co., Ltd.) having a refractive index of 1.6 as a high-refractive-index material in methyl ethyl ketone as a solvent was applied to a surface of the light entrance portion on the opposite side to a light entrance surface of the light entrance portion such that the solution had a thickness of approximately 50 μm, then the solution was dried, and a wavelength converting portion was thus formed.

—Formation of Minute Concave and Convex Portions at Light Exit Portion—

Surfaces of the light exit portion were subjected to sand blasting so as to form minute concave and convex portions at the surfaces.

In this manner, a light guiding film according to Example 1 was produced.

Example 2

A light guiding film according to Example 2 was produced in the same manner as in Example 1 except that the reflective layers were not formed at the end surfaces (with respect to the thickness direction of the film).

Example 3

A light guiding film according to Example 3 was produced in the same manner as in Example 1 except that the minute concave and convex portions were not formed at the light exit portion.

Example 4

A light guiding film according to Example 4 was produced in the same manner as in Example 1 except that the reflective layers were not formed at the end surfaces (with respect to the thickness direction of the film) and that the minute concave and convex portions were not formed at the light exit portion.

Example 5

A light guiding film according to Example 5 was produced in the same manner as in Example 1 except that perylene orange (LUMOGEN F ORANGE 240, manufactured by BASF SE) was used as a fluorescent material instead of the perylene red (LUMOGEN F RED 305, manufactured by BASF SE).

Comparative Example 1

A light guiding film according to Comparative Example 1 was produced in the same manner as in Example 1 except that the wavelength converting portion was not formed on the surface on the opposite side to the light entrance surface, that the reflective layers were not formed at the end surfaces (with respect to the thickness direction of the film) and that the minute concave and convex portions were not formed at the light exit portion.

Comparative Example 2

A light guiding film according to Comparative Example 2 was produced in the same manner as in Example 1 except that the wavelength converting portion was not formed on the surface on the opposite side to the light entrance surface.

(Method of Evaluating Promotion of Growth of Plant)

Using the light guiding films of Examples 1 to 5 and Comparative Examples 1 and 2, promotion of growth of a plant was evaluated as follows.

Figure 10:
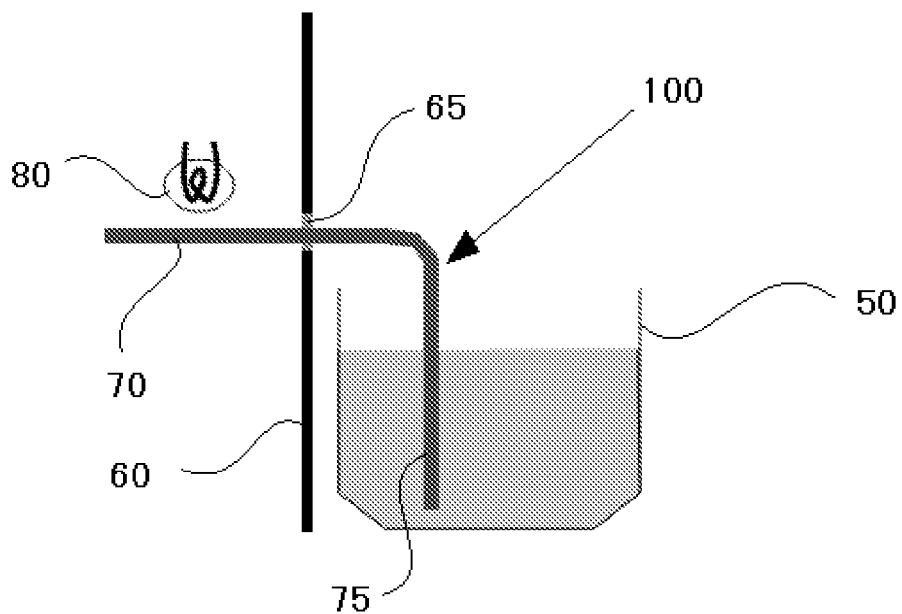
FIG. 10 shows an apparatus for evaluating growth of a plant in Examples and Comparative Examples.

As shown in FIG. 10, a water tank 50 was placed in a dark room shielded by a light-shielding plate 60, and this water tank 50 was filled with chlorella having a concentration of 500,000 chlorella cells per milliliter. A light guiding film 100 was inserted through a cut portion 65 of the light-shielding plate 60 from the side of a light exit portion 75 such that light leakage did not arise, the light guiding film 100 was bent in the approximate middle (with respect to the lengthwise direction of the light guiding film 100) with a curvature radius of 20 mm, light from a lamp 80 was enabled to enter a light entrance portion 70, and the light exit portion 75 was immersed in the contents of the water tank 50. The light guiding film 100 was thusly placed.

Figure 11:
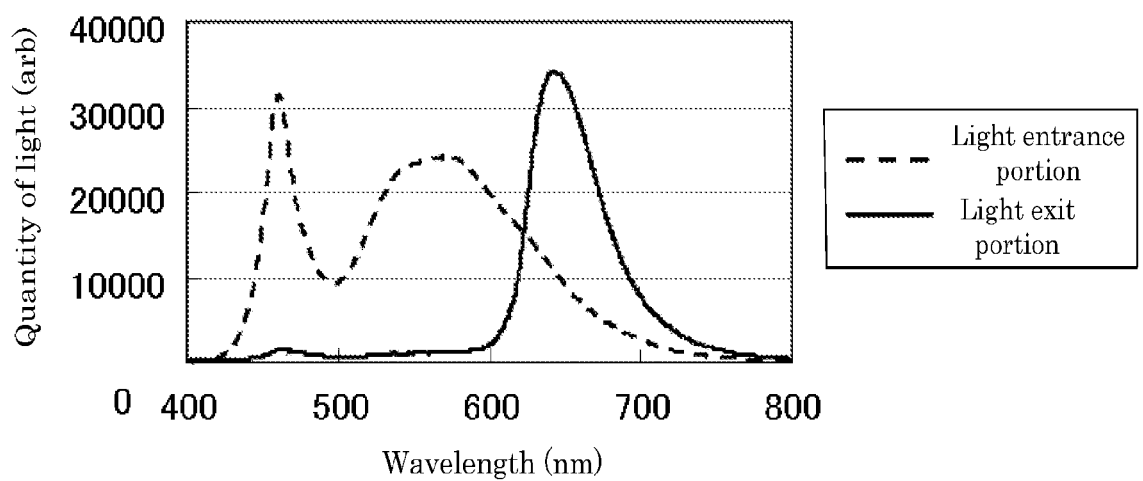
FIG. 11 is a diagram showing a relationship between the wavelength of light at a light entrance portion and the wavelength of light with a converted wavelength exiting from a light exit portion, and also a relationship between the quantity of light entering from the light entrance portion and the quantity of light exiting from the light exit portion.

FIG. 11 shows the result of previously measuring relationships between the quantities of incident light and exit light and the wavelengths of the incident light and the exit light with the use of an LED lamp (ECOLAMP 95W, manufactured by NIHON YUSAC CORPORATION) and an apparatus (USB2000, manufactured by Ocean Photonics), as the light exit portion of the light guiding film according to Example 1 was placed in the water tank not filled with chlorella.

As shown in FIG. 11, the light entrance portion received light which primarily ranged between 400 nm and 600 nm in wavelength, and the light exit portion allowed light having a peak wavelength of approximately 650 nm to exit. Also, the light guiding film enabled half or more of the quantity of the light received by the light entrance portion to exit from the light exit portion.

A 100 W halogen lamp, greater in light quantity than LED lamps, was used as the lamp 80. Light was applied to the light entrance portion 70 of the light guiding film 100 that was placed such that the light from the lamp 80 was able to enter the light entrance portion 70 and that the light exit portion 75 was immersed in the contents of the water tank 50, as described above, and the chlorella in the water tank 50 was thus cultivated.

The application of light with the lamp 80 was continued for 24 hours. Thereafter, the number of chlorella cells was measured using an optical microscope, this number was compared with the number measured before the test so as to calculate the increase-decrease rate, and evaluations were carried out based upon the following evaluation criteria. The results are shown in Table 1 below.

Also in Table 1, an evaluation of promotion of growth of a plant, in the case where the light guiding film 100 was not used and direct application of light from the lamp 80 to the water tank 50 was continued for 24 hours, is shown as Reference Example 1.

<Evaluation Criteria>

A: The increase rate of chlorella cells was 20% or more.

B: The increase rate of chlorella cells was 10% or more, but less than 20%.

C: The increase rate of chlorella cells was 0% or more, but less than 10%.

D: The increase rate of chlorella cells was less than 0%.

TABLE 1

|  | Ex. 1 | Ex. 2 | Ex. 3 | Ex. 4 | Ex. 5 | Comp. Ex. 1 | Comp. Ex. 2 | Ref. Ex. 1 |
|---|---|---|---|---|---|---|---|---|
| Fluorescent material for wavelength converting portion | Red fluorescent | Red fluorescent | Red fluorescent | Red fluorescent | Orange fluorescent | None | None | — |
| Surface treatment at light exit portion | Sand blasting | Sand blasting | None | None | Sand blasting | None | Sand blasting | — |
| Reflective layer at end | Aluminum tape | None | Aluminum tape | None | Aluminum tape | None | Aluminum tape | — |
| Growth | A 2 times | B 1.7 times | B 1.5 times | C 1.3 times | A 1.1 times | D 0.7 times | D 0.7 times | 0.7 times |

As can be understood from Table 1, the light guiding films of Examples 1 to 5, each including the wavelength converting portion on the surface on the opposite side to the light entrance surface, can promote growth of a plant to a far greater extent than the light guiding films of Comparative Examples 1 and 2 which did not include the wavelength converting portion.

What is claimed is:

1. A light guiding film comprising:
a light entrance portion which allows incident light from a light source to enter;
a wavelength converting portion which absorbs the incident light and converts the wavelength of the incident light to a wavelength utilizable for growth of a plant; and
a light exit portion which allows the light with the converted wavelength to exit,
wherein the light entrance portion and the light exit portion are located at opposite sides of the light guiding film in a longitudinal direction of the light guiding film,
wherein the light entrance portion includes a light entrance surface,
wherein the wavelength converting portion is provided on a surface of the light entrance portion on a side opposite to the light entrance surface in a direction perpendicular to the longitudinal direction, and
wherein a refractive index of the wavelength converting portion is higher than a refractive index of the light entrance portion.

2. The light guiding film according to claim 1, wherein the relationship $\lambda_1 < \lambda_2$ is satisfied, where $\lambda_1$ (nm) denotes a peak wavelength of the light absorbed by the wavelength converting portion, and $\lambda_2$ (nm) denotes a peak wavelength of the light with the converted wavelength.

3. The light guiding film according to claim 2, wherein $\lambda_1$ is in the range of 300 nm to 700 nm, and $\lambda_2$ is in the range of 400 nm to 1,000 nm.

4. The light guiding film according to claim 1, wherein the wavelength converting portion includes a fluorescent material.

5. The light guiding film according to claim 4, wherein the fluorescent material contains a perylene compound.

6. The light guiding film according to claim 1, further comprising a light guiding portion which guides the light with the converted wavelength, situated between the light entrance portion and the light exit portion.

7. The light guiding film according to claim 6, further comprising a reflective layer formed on a surface of the light entrance portion with respect to a film thickness direction or on surfaces of the light entrance portion and the light guiding portion with respect to the film thickness direction.

8. The light guiding film according to claim 1, wherein the light entrance portion has a refractive index of 1.05 to 1.8.

9. The light guiding film according to claim 1, wherein the wavelength converting portion has a refractive index of 1.5 or greater.

10. The light guiding film according to claim 1, wherein the difference in refractive index between the wavelength converting portion and the light entrance portion is in the range of 0.01 to 2.0.

11. The light guiding film according to claim 1, wherein the light exit portion has minute concave and convex portions at at least part of a surface thereof.

12. A plant growing method comprising:
growing a plant using a light guiding film,
wherein the light guiding film comprises:
a light entrance portion which allows incident light from a light source to enter;
a wavelength converting portion which absorbs the incident light and converts the wavelength of the incident light to a wavelength utilizable for growth of a plant; and
a light exit portion which allows the light with the converted wavelength to exit,
wherein the light entrance portion and the light exit portion are located at opposite sides of the light guiding film in a longitudinal direction of the light guiding film,
wherein the light entrance portion includes a light entrance surface,
wherein the wavelength converting portion is provided on a surface of the light entrance portion on a side opposite to the light entrance surface in a direction perpendicular to the longitudinal direction,
wherein a refractive index of the wavelength converting portion is higher than a refractive index of the light entrance portion, and
wherein the wavelength of the light which has entered from the light entrance portion of the light guiding film is converted to a wavelength utilizable for growth of the plant, and the light exit portion of the light guiding film is placed so as to allow the light to exit from the light exit portion to a place for the growth of the plant.

13. The plant growing method according to claim 12, wherein the plant is algae including microalgae.

14. The plant growing method according to claim 12, wherein the light entrance portion is located above a water surface and the light exit portion is located under the water surface.

15. The plant growing method according to claim 12, wherein the wavelength converting portion contains a fluorescent material, and
wherein the fluorescent material is perylene red or perylene orange.

* * * * *